UNITED STATES PATENT OFFICE.

MARC W. BEYLIKGY, OF NEW YORK, N. Y., ASSIGNOR OF ONE-HALF TO CHARLES J. EVERETT, OF TENAFLY, NEW JERSEY.

SILICATE COMPOUND.

SPECIFICATION forming part of Letters Patent No. 448,772, dated March 24, 1891.

Application filed November 19, 1890. Serial No. 371,959. (No specimens.)

*To all whom it may concern:*

Be it known that I, MARC W. BEYLIKGY, of the city and county of New York, in the State of New York, have invented a new and useful Silicate Compound, of which the following is a specification.

This new compound consists of the alkaline magnesian silicate hereinafter described, and is specially intended as a substitute for simple alkaline polysilicates commonly termed "soluble silicate" or "water-glass." This alkaline magnesian silicate, unlike the simple alkaline silicates, which are procurable in the market either in fluid or in dry form, can only be prepared and kept in solution, as it is endowed with the peculiar property of being rendered insoluble in time by perfect drying, after which it cannot be redissolved to be again used. This peculiarity gives it the advantage of dispensing with the application of acids or ammoniacal salts for the purpose of securing resistance to the solvent action of water and preventing exudation in damp weather, such applications being only safe when applied superficially. If carried to the fullest extent, they disintegrate the mass and impair the original glutinous tenacity. A silicate compound embodying all the requisite qualities inherent in its nature was therefore still wanting prior to the invention of the alkaline magnesian silicate that forms the subject of this present application for Letters Patent.

For the preparation of the said compound I adopt the following process as the most effectual:

I take commercial tersilicate of soda and add sufficient boiling water to make a solution of thick sirupy consistence. To every one hundred parts, by weight, of dry silicate contained in the liquor I incorporate by brisk agitation and in successive portions eleven parts of a compound salt formed by three molecules of fluosilicate of magnesium and one of normal hydrocarbonate of magnesia triturated with fifty parts of water. A mutual reaction between the combining elements readily ensues, the result being fluosilicate of sodium and hydrosilicate of magnesia, combined with and dissolved out of large excess of polysilicates of soda and the carbonate of the same basis, as expressed in the following equation:

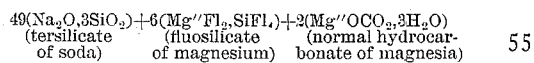
(tersilicate   (fluosilicate   (normal hydrocar-
of soda)   of magnesium)   bonate of magnesia)

decomposed into

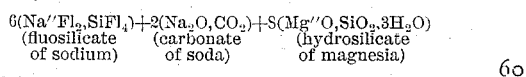
(fluosilicate   (carbonate   (hydrosilicate
of sodium)   of soda)   of magnesia)

combined with and dissolved by

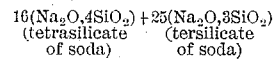
(tetrasilicate   (tersilicate
of soda)   of soda)

After this primary reaction a secondary one gradually takes place in the progress of drying of the mass by virtue of prolonged contact of concentrated fluosilicate of sodium already formed and the alkaline polysilicates left in excess, whereupon the former is split into fluoride of sodium, silicon, and fluorine. This latter readily combines with the positive element of the alkaline silicates with evolution of oxygen, which, abstracted by the silicon, promotes its simultaneous conversion into silicic acid. It is taken up by the excess of alkaline silicates, together with the entire amount of silicic acid liberated by the first action of fluorine upon the corresponding equivalent of polysilicates of soda, converting them ultimately into pentasilicate to combine with the preceding hydrosilicate of magnesia. According to the equation:

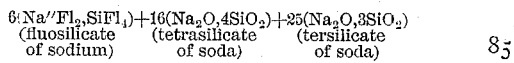
(fluosilicate   (tetrasilicate   (tersilicate
of sodium)   of soda)   of soda)

equal to

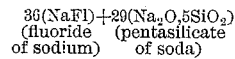
(fluoride   (pentasilicate
of sodium)   of soda)

If in place of the magnesian compound salt as given above fluosilicate of magnesium were simply used, the relative proportion of magnesia would have been less than required. The fluosilicate of magnesium is, however, preferable if the alkaline silicate under operation is more silicious than what is represented in tersilicate, knowing that the magnesia is proportionated to the basicity of the alkaline silicate.

The magnesian compound salt is liable to disengage spontaneously carbonic acid and be transformed into a basic compound. That does not modify, however, its former action upon the alkaline silicates to any objectionable extent.

The relative proportion of the magnesian salt as given above may be reduced or increased within certain limits for special results.

The secondary reaction illustrated in the next preceding formula is similar to that occasioned when hydrofluosilicic acid is allowed to react upon excess of kaolin (hydrosilicate of alumina) after the fluosilicate of that basis is formed, in which case fluoride of aluminium only will be obtained with entire elimination of silicic acid. In either case it is the compound produced by the series of decomposition and recomposition just described, which is my alkaline magnesian silicate. It is endowed with the properties of the simple alkaline silicates in the application to arts plus the insolubility when once thoroughly dried.

The indispensable property of resisting the action of water or of moist air while cohesion and flexibility are fully preserved being realized in this new compound renders it applicable to many important purposes in the arts to which water-glass has been unsuccessfully applied and to those purposes which no treatment with acids can serve.

In preparing the said alkaline magnesian silicate it may be suggested to substitute the hydrofluosilicic acid by some other acid which implies omission of the secondary reaction. It may be thought to prepare the hydrosilicate of magnesia separately and add it to alkaline polysilicates. Soda may be exchanged for potash, but such modifications of the adopted formula can only be considered as so many experiments in proving the possibility of preparing an alkaline-magnesian silicate regardless of disadvantages.

My alkaline-magnesian-silicate compound may be applied *per se* when a thin surface-coating only is desired. If a mass of considerable thickness is to be obtained, the incorporation of some fibrous micaceous and crystalline or amorphous excipient becomes necessary.

My alkaline-magnesian-silicate solution is liable to gelatinize, but its fluidity may be restored by the addition of some more water and the application of moderate heat, provided it is not concreted into a tough mass through the gradual decomposition of fluosilicate of sodium into a fluoride under the action of the excess of alkaline polysilicates, a reaction which may take place in the course of time even in presence of water, in which case the mass cannot be redissolved by heating.

What I claim as my invention is—

The within-described alkaline-magnesian-silicate solution, in which the silicate has the general formula $7(Na_2O,5SiO_2),2(Mg''OSiO_2)$.

MARC W. BEYLIKGY.

Witnesses:
FREDK. HAYNES,
D. H. HAYWOOD.